(12) United States Patent
Cheng et al.

(10) Patent No.: US 9,409,623 B1
(45) Date of Patent: Aug. 9, 2016

(54) BICYCLE PEDAL STRUCTURE CAPABLE OF TRIGGERING AUXILIARY POWER

(71) Applicant: MOTIVE POWER INDUSTRY CO., LTD., Dacun Township (TW)

(72) Inventors: Hsin-Lin Cheng, Dacun Township (TW); Ching-Chung Teng, Dacun Township (TW)

(73) Assignee: MOTIVE POWER INDUSTRY CO., LTD. (TW)

( * ) Notice: Subject to any disclaimer, the term of this patent is extended or adjusted under 35 U.S.C. 154(b) by 0 days.

(21) Appl. No.: 14/732,922

(22) Filed: Jun. 8, 2015

(51) Int. Cl.
*B62M 6/50* (2010.01)
*B62M 3/00* (2006.01)

(52) U.S. Cl.
CPC *B62M 6/50* (2013.01); *B62M 3/003* (2013.01)

(58) Field of Classification Search
CPC .......... B62M 3/003; B62M 6/50; B62M 6/55; B62M 1/36; B62D 6/10; G01L 3/108; Y10T 74/2164; Y10T 74/2165
See application file for complete search history.

(56) References Cited

U.S. PATENT DOCUMENTS

| 6,889,809 B2 * | 5/2005 | Yoshiie | B62M 6/45 192/46 |
| 2011/0006760 A1 * | 1/2011 | Glueck | B62M 3/003 324/207.25 |

FOREIGN PATENT DOCUMENTS

DE  102010018658 A1 * 12/2010 ............. B62M 3/003

* cited by examiner

*Primary Examiner* — Thomas Diaz
(74) *Attorney, Agent, or Firm* — Schmeiser, Olsen & Watts, LLP

(57) ABSTRACT

A bicycle pedal structure capable of triggering auxiliary power includes a base, sleeve unit, crank shaft, pedal cranks and treading force sensing unit. The sleeve unit has first and second sleeves disposed in two openings of the base. The crank shaft is fitted in the first and second sleeves and thus rotatably disposed in the base. The pedal cranks are coupled to two ends of the crank shaft, extend in opposite directions, are substantially perpendicular to the crank shaft, and each have a pedal for rotating the crank shaft under a treading force. The treading force sensing unit has piezoelectric plates disposed on at least the first and second sleeves and above the crank shaft. The bicycle pedal structure is mounted on a bicycle chassis and connected to a driving-controlling system to trigger the driving-controlling system to generate and supply digit modularized auxiliary power to the bicycle pedal structure.

6 Claims, 5 Drawing Sheets

BICYCLE PEDAL STRUCTURE CAPABLE OF TRIGGERING AUXILIARY POWER

FIELD OF TECHNOLOGY

The present invention relates to bicycle pedal structures capable of triggering auxiliary power and more particularly to a bicycle pedal structure which is capable of triggering auxiliary power and mounted on a bicycle chassis to supply auxiliary power to an electric bicycle and thus drive the electric bicycle to move.

BACKGROUND

A conventional bicycle essentially comprises a pedal structure, a gear train coupled to a wheel axis, and a chain connected between the pedal structure and the gear train. In general, the pedal structure has a crank shaft, a gear coupled to the crank shaft, and pedal cranks disposed at the two ends of the crank shaft, respectively, such that a cyclist treads on the pedals connected to the pedal cranks to thereby rotate the crank shaft, thus allowing the chain to drive the wheels of the bicycle to rotate.

To render cycling less laborious, the prior art discloses a bicycle which comprises a driving motor and a controller thereof so as for the driving motor to supply auxiliary power required for the rotation of a crank shaft coupled to a bicycle pedal structure. In this regard, a sensor is mounted on the crank shaft coupled to the bicycle pedal structure to thereby detect the rotation speed and torque of the crank shaft, so as to determine whether the controller is operating and determine whether to adjust the operating status of the driving motor.

Since the sensor is mounted on the crank shaft, it not only rotates together with the crank shaft but also transmits an electrical signal by coming into contact with a collector ring. As a result, the sensor is predisposed to poor contact with a collector ring and thus unstable transmission of the electrical signal. In addition, the overall structure is not only intricate but also vulnerable.

SUMMARY

It is an objective of the present invention to provide a bicycle pedal structure which is capable of triggering auxiliary power, structurally simple, and operating with the least possible parts and components.

In order to achieve the above and other objectives, the present invention provides a bicycle pedal structure capable of triggering auxiliary power. The bicycle pedal structure is mounted on a bicycle chassis and connected to a driving-controlling system. The bicycle pedal structure comprises a base, a sleeve unit, a crank shaft, two pedal cranks and a treading force sensing unit. The base has a first opening and a second opening. The sleeve unit is disposed in the base and has a first sleeve and a second sleeve. The first sleeve is disposed in the first opening. The second sleeve is disposed in the second opening. The crank shaft is fitted in the first sleeve and the second sleeve and rotatably disposed in the base. The two pedal cranks are coupled to two ends of the crank shaft, respectively, extending in opposite directions, being substantially perpendicular to the crank shaft, and having a pedal each for rotating the crank shaft under a treading force. The treading force sensing unit has a plurality of piezoelectric plates. The piezoelectric plates are disposed on at least the first sleeve and the second sleeve and above the crank shaft.

As regards the bicycle pedal structure, the treading force sensing unit has four piezoelectric plates. The piezoelectric plates are disposed on the first sleeve and the second sleeve, above and below the crank shaft, respectively.

As regards the bicycle pedal structure, the first sleeve and the second sleeve each have a bearing for supporting the crank shaft.

The bicycle pedal structure further comprises a rotation speed sensor disposed on the first sleeve and spaced apart from the piezoelectric plates.

As regards the bicycle pedal structure, the first sleeve and the second sleeve each have a flange whereby the bicycle pedal structure is fixed to the base.

As regards the bicycle pedal structure, the treading force sensing unit is disposed on a sleeve unit which does not rotate such that the treading force sensing unit does not rotate along with the crank shaft while the cyclist is riding the bicycle. Therefore, the bicycle pedal structure is not only simple in terms of its circuit, parts and components but also invulnerable.

BRIEF DESCRIPTION

Objectives, features, and advantages of the present invention are hereunder illustrated with specific embodiments in conjunction with the accompanying drawings, in which.

DETAILED DESCRIPTION

In an embodiment of the present invention, a bicycle pedal structure 1 capable of triggering auxiliary power is mounted on a bicycle chassis (not shown) and connected to a driving-controlling system (not shown). The driving-controlling system comprises a controller and a driving motor. The controller controls the strength of the output torque generated from the auxiliary power supplied by the driving motor. As soon as the driving-controlling system detects that a cyclist is treading, the controller is triggered to either start the driving motor or change the output torque of the driving motor so as to provide digital modularized auxiliary power to the bicycle pedal structure 1, thereby supplementing or replacing the power required for the forward motion of the bicycle.

Figure 1:
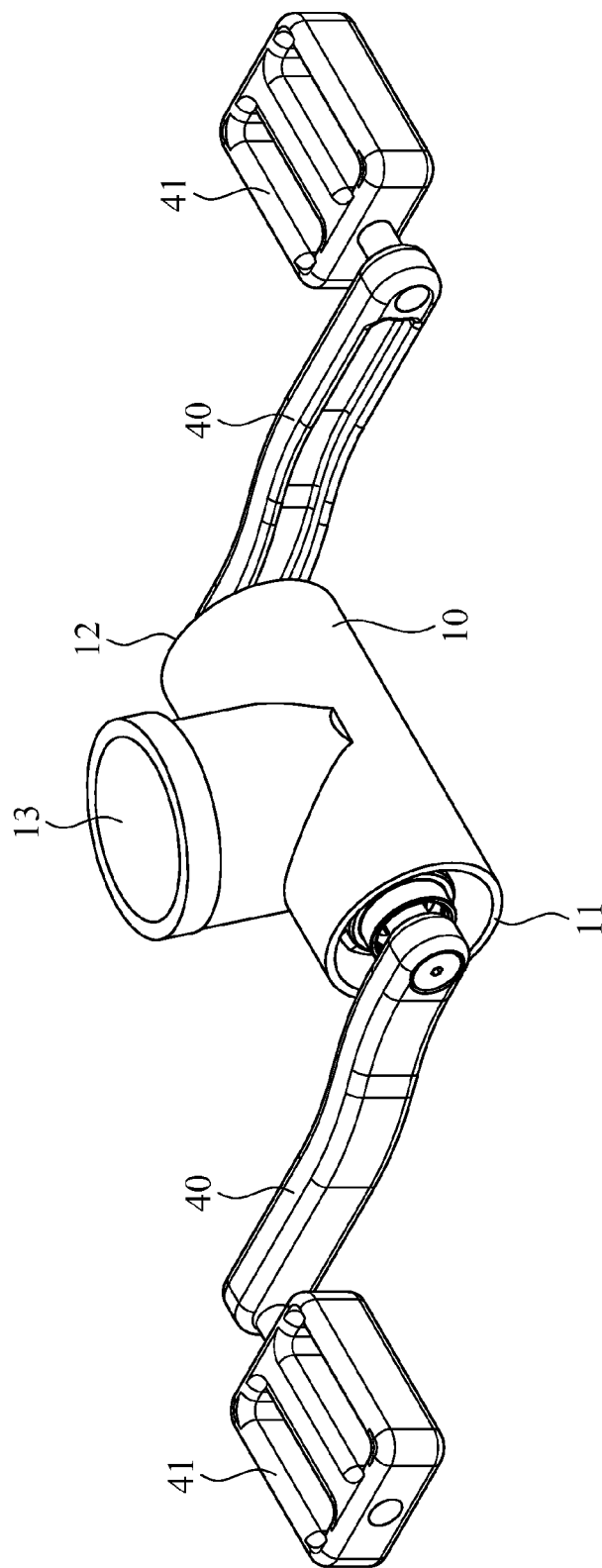
FIG. 1 is a perspective view of a bicycle pedal structure according to an embodiment of the present invention.
Figure 2:
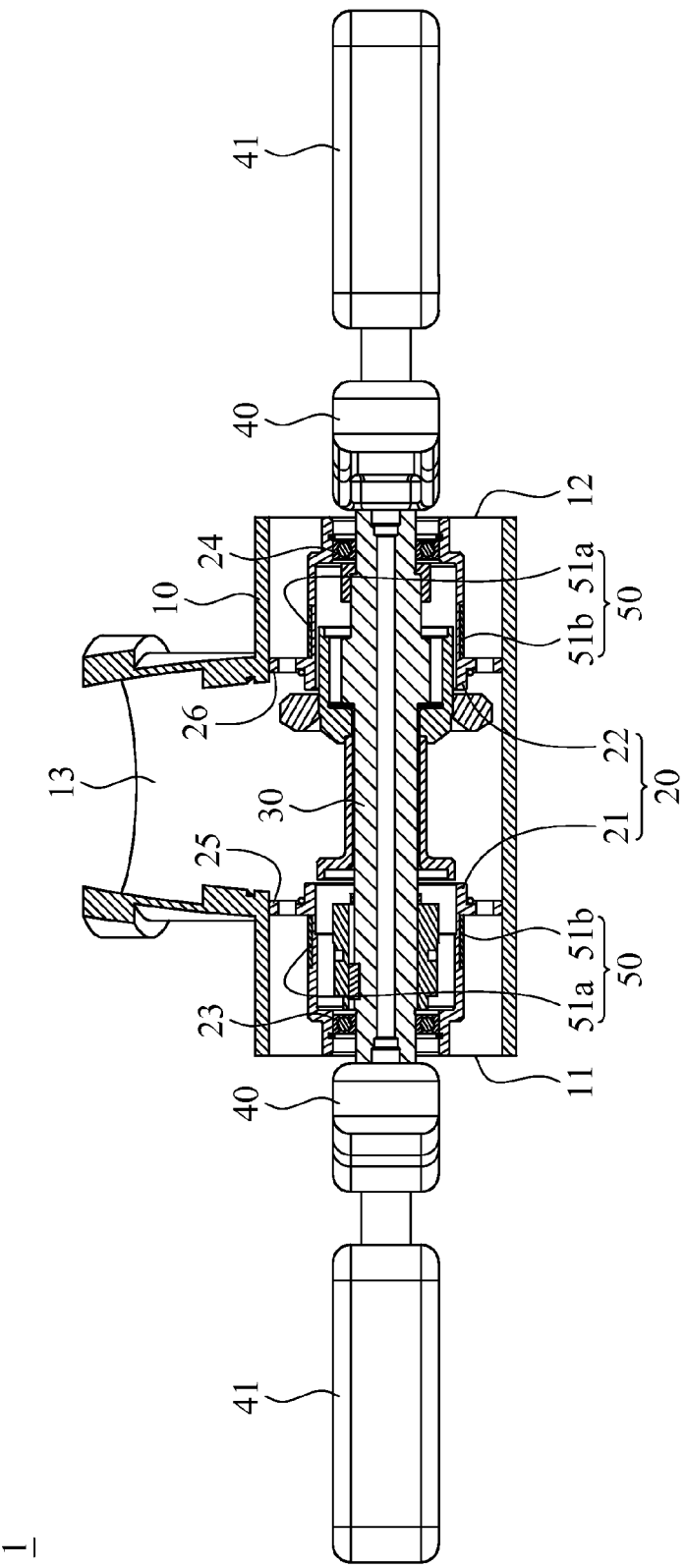
FIG. 2 is a cross-sectional view of the bicycle pedal structure according to the embodiment of the present invention.

Referring to FIG. 1 and FIG. 2, in an embodiment of the present invention, the bicycle pedal structure 1 comprises a base 10, a single-sided sleeve 20, a crank shaft 30, two pedal cranks 40 and a treading force sensing unit 50. The base 10 has a first opening 11 and a second opening 12. The sleeve unit 20 is disposed in the base 10 and has a first sleeve 21 and a second sleeve 22. The first sleeve 21 is disposed in the first opening 11. The second sleeve 22 is disposed in the second opening 12. The crank shaft 30 is fitted in the first sleeve 21 and the second sleeve 22 and thus rotatably disposed in the base 10. The two pedal cranks 40 are coupled to the two ends of the crank shaft 30, respectively. The two pedal cranks 40 extend in opposite directions and are substantially perpendicular to the crank shaft 30. The pedal cranks 40 each have a pedal 41. The treading forces generated from the cyclist's left and right feet are exerted on the pedals 41, respectively, to rotate the crank shaft 30. The treading force sensing unit 50 has a plurality of piezoelectric plates 51a. The piezoelectric plates 51a are disposed on at least the first sleeve 21 and the second sleeve 22 and above the crank shaft 30.

Referring to FIG. 1, the base 10 is provided in the form of a casing which has therein a receiving space. The first opening 11 and the second opening 12 are opposite to each other and flank the bicycle. The base 10 further has a third opening 13 whereby the base 10 is mounted on the bicycle chassis.

Referring to FIG. 2, the sleeve unit 20 is disposed in the base 10. The first sleeve 21 is disposed in the first opening 11. The second sleeve 22 is disposed in the second opening 12. The first sleeve 21 and the second sleeve 22 are fitted at the two ends of the crank shaft 30, respectively. The first sleeve 21 has therein a bearing 23. The second bearing 22 has therein a bearing 24. The bearings 23, 24 support the crank shaft 30 in a manner to allow the crank shaft 30 to be rotatably disposed in the base 10.

Figure 3:
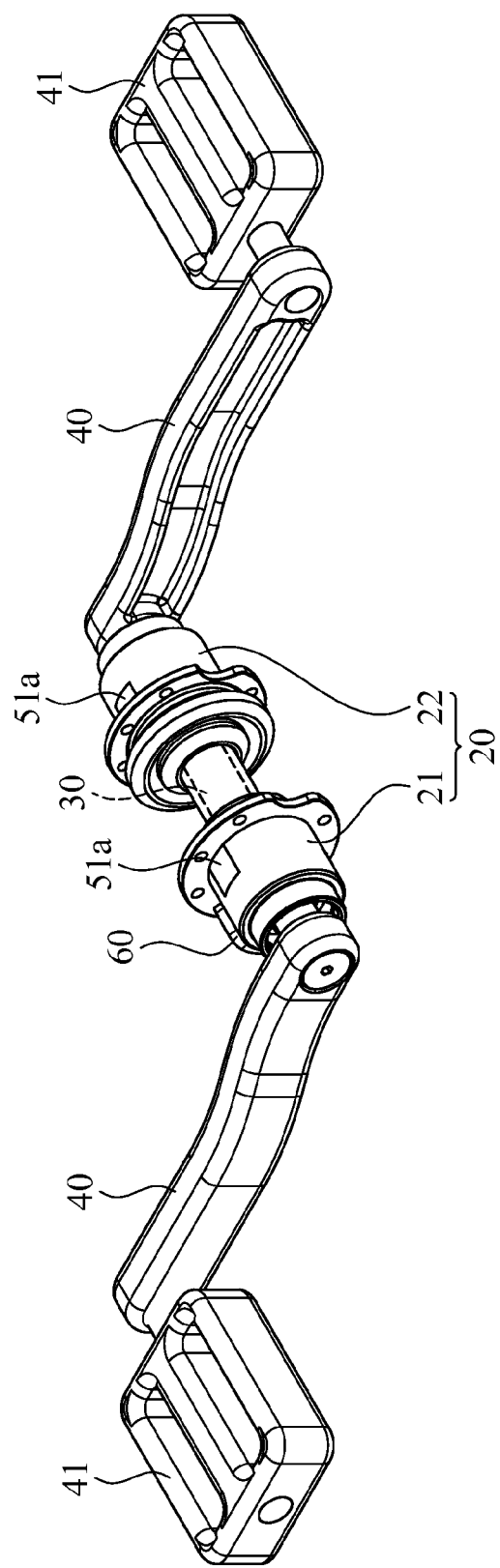
FIG. 3 is another perspective view of the bicycle pedal structure according to the embodiment of the present invention.
Figure 4:
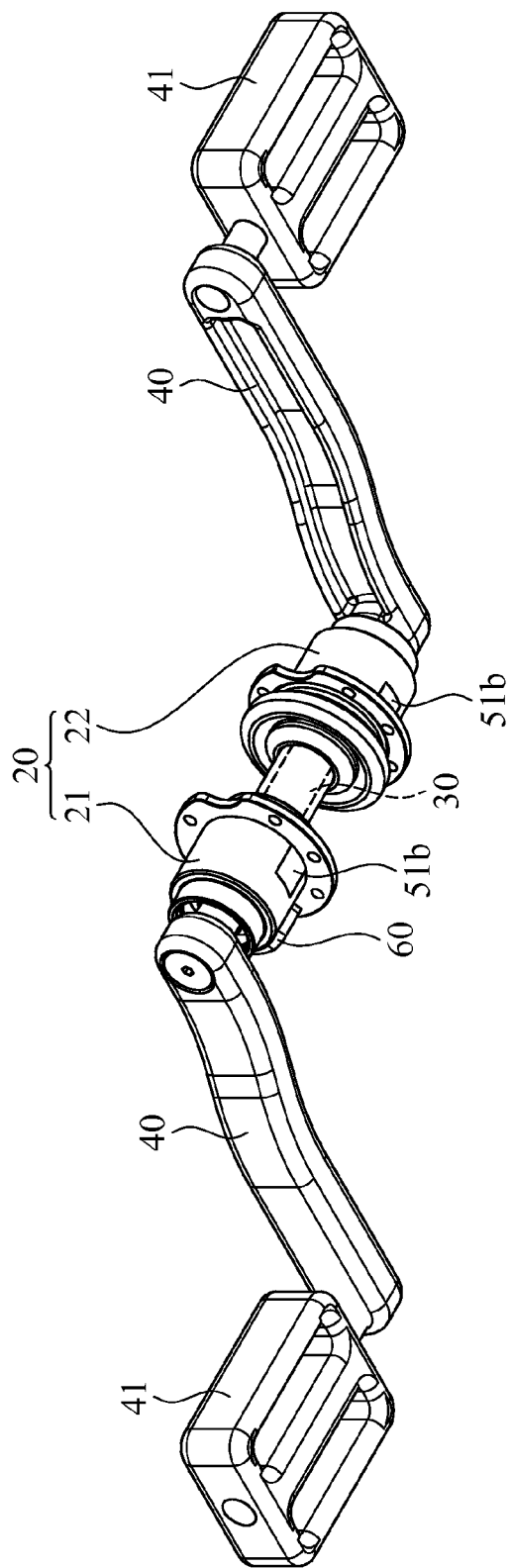
FIG. 4 is another perspective view of the bicycle pedal structure taken at another angle according to the embodiment of the present invention.

In this embodiment, the treading force sensing unit 50 has at least two piezoelectric plates 51a. The piezoelectric plates 51a are disposed on at least the first sleeve 21 and the second sleeve 22 and above the crank shaft 30. Referring to FIG. 3 and FIG. 4, the treading force sensing unit 50 has four piezoelectric plates 51a, 51b. The piezoelectric plates 51a, 51b are disposed on at least the first sleeve 21 and the second sleeve 22, respectively, and are positioned above and below the crank shaft 30, respectively. Hence, when a bicycle with the bicycle pedal structure 1 is advancing, the piezoelectric plates 51a disposed on the first sleeve 21 and the second sleeve 22 are farthest from the ground, whereas the piezoelectric plates 51b disposed on the first sleeve 21 and the second sleeve 22 are closest to the ground. Referring to FIG. 3 and FIG. 4, a flange 25, 26 is disposed at the end of each of the first sleeve 21 and the second sleeve 22. The edges of the flange 25, 26 are engaged with the base 10 from inside to thereby allow the first sleeve 21 and the second sleeve 22 to be fixed to the base 10.

The bicycle pedal structure 1 has a rotation speed sensor 60. The rotation speed sensor 60 is disposed on the first sleeve 21 and spaced apart from the piezoelectric plates 51a, 51b. For example, an included angle of 90 degrees is formed between the line which joins the rotation speed sensor 60 to the center of the crank shaft 30 and the line which joins the piezoelectric plates 51a or the piezoelectric plates 51b to the center of the crank shaft 30. The purpose of the rotation speed sensor 60 is to measure the rotation speed of the crank shaft 30. The rotation speed sensor 60 is exemplified by a Hall sensing component.

Figure 5:
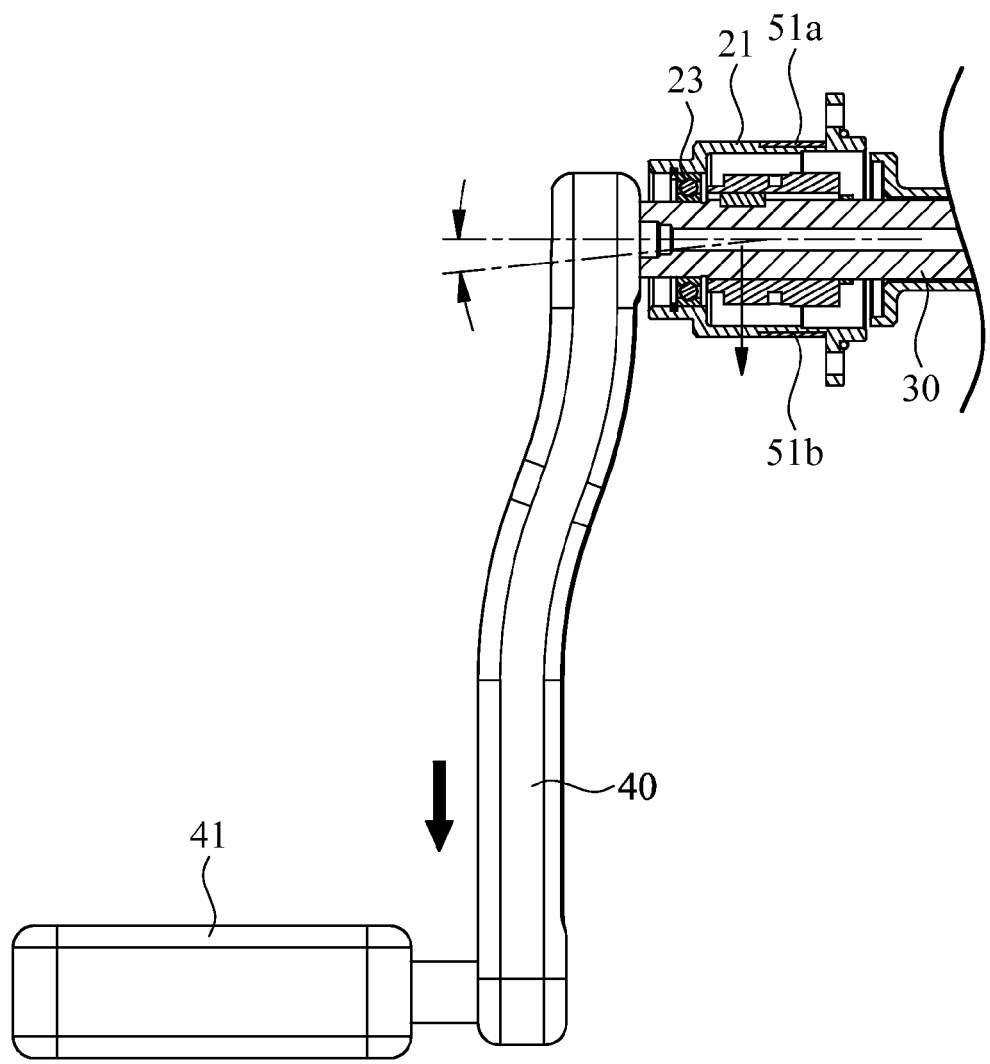
FIG. 5 is a schematic view of the operation of a crank shaft according to the embodiment of the present invention.

Referring to FIG. 5, in this embodiment, when the cyclist treads on the pedals 41 and thus exerts a downward treading force thereon to thereby enable the pedal cranks 40 to rotate the crank shaft 30; meanwhile, the downward treading force is conveyed to the crank shaft 30 through the pedal cranks 40 so as to not only bend the crank shaft 30 slightly but also deform the first sleeve 21. Hence, the piezoelectric plates 51a, 51b above and below the crank shaft 30 deform, undergo voltage changes, and eventually send an electrical signal to the driving-controlling system. The electrical signal thus sent triggers the driving-controlling system to generate digit modularized auxiliary power. The auxiliary power drives the crank shaft 30 to rotate; hence, it is less laborious for the cyclist to produce the treading force than without the bicycle pedal structure 1 of the present invention.

According to the embodiment of the present invention, the bicycle pedal structure 1 is characterized in that the treading force sensing unit 50 is disposed on the sleeve unit 20 which does not rotate such that the treading force sensing unit 50 does not rotate along with the crank shaft 30 while the cyclist is riding the bicycle. Therefore, the bicycle pedal structure 1 is not only simple in terms of its circuit, parts and components but also invulnerable.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A bicycle pedal structure capable of triggering auxiliary power and configured to be mounted on a bicycle chassis and connected to a driving-controlling system, the bicycle pedal structure comprising:
   a base having a first opening and a second opening;
   a sleeve unit disposed in the base and having a first sleeve and a second sleeve, with the first sleeve disposed in the first opening and the second sleeve disposed in the second opening;
   a crank shaft fitted in the first sleeve and the second sleeve and rotatably disposed in the base;
   two pedal cranks coupled to two ends of the crank shaft, respectively, extending in opposite directions, being substantially perpendicular to the crank shaft, and having a pedal each for rotating the crank shaft under a treading force; and
   a treading force sensing unit having a plurality of piezoelectric plates disposed on at least the first sleeve and the second sleeve and above the crank shaft, wherein the treading force sensing unit has four piezoelectric plates disposed on at least the first sleeve and the second sleeve, above and below the crank shaft, respectively.

2. The bicycle pedal structure of claim 1, wherein the first sleeve and the second sleeve each have a bearing for supporting the crank shaft.

3. The bicycle pedal structure of claim 2, further comprising a rotation speed sensor disposed on the first sleeve and spaced apart from the piezoelectric plates.

4. The bicycle pedal structure of claim 1, further comprising a rotation speed sensor disposed on the first sleeve and spaced apart from the piezoelectric plates.

5. The bicycle pedal structure of claim 3, wherein the first sleeve and the second sleeve each have a flange whereby the first sleeve and the second sleeve are fixed to the base.

6. The bicycle pedal structure of claim 4, wherein the first sleeve and the second sleeve each have a flange whereby the first sleeve and the second sleeve are fixed to the base.

\* \* \* \* \*